United States Patent [19]

Brimer et al.

[11] 4,081,726

[45] Mar. 28, 1978

[54] ELECTRIC MOTOR

[75] Inventors: Claude Morris Brimer, Tuscon, Ariz.; Joe W. Von Brimer, deceased, late of Las Vegas, Nev., by Claude Morris Brimer, executor

[73] Assignee: Linear International Corporation, Rancho La Costa, Calif.

[21] Appl. No.: 638,519

[22] Filed: Jan. 5, 1976

[51] Int. Cl.² ............................................. H02K 17/00
[52] U.S. Cl. ............................... 318/207 A; 318/221 D; 310/166; 310/268
[58] Field of Search ................................ 310/166, 268; 318/206 R, 207 R, 207 A, 221 D

[56] References Cited

U.S. PATENT DOCUMENTS

| 2,476,073 | 7/1949 | Trickey | 318/221 D X |
| 2,549,265 | 4/1951 | Trant | 318/221 D X |
| 3,194,032 | 7/1965 | Von Brimer | 310/166 X |
| 3,223,867 | 12/1965 | Shapiro | 310/166 |
| 3,225,235 | 12/1965 | Lee | 310/268 |
| 3,333,124 | 7/1967 | Francis et al. | 310/268 X |
| 3,355,914 | 12/1967 | Venema et al. | 310/268 X |
| 3,688,170 | 8/1972 | Karklys et al. | 318/207 A |

Primary Examiner—Donovan F. Duggan
Attorney, Agent, or Firm—Lockwood, Dewey, Zickert & Alex

[57] ABSTRACT

An electric induction motor having at least two phases and including opposed slotted stator bodies or pole pieces with each slot receiving a radially extending leg or like portion of at least one coil winding, and with the stator being preferably of an annular, segmented configurationand the rotor being a low inertia, non-magnetic, radially slotted, electrically conductive disc axially spaced from the face of the stator bodies. The motor is particularly adapted for direct drive of rapidly reversible driven members, such as washing machine agitators or the like, and is characterized by high starting torque and a relatively direct proportional relation between the applied voltage and available output torques. In use, the motor operates at varying speeds and torque as it reverses direction and accelerates to a given rotational velocity, drawing substantially constant power during use. The current paths characterizing the unit are similar to the currents in a squirrel cage motor, while an axial gap, low inertia rotor provides the advantages of easy reversibility and maximal heat loss.

12 Claims, 5 Drawing Figures

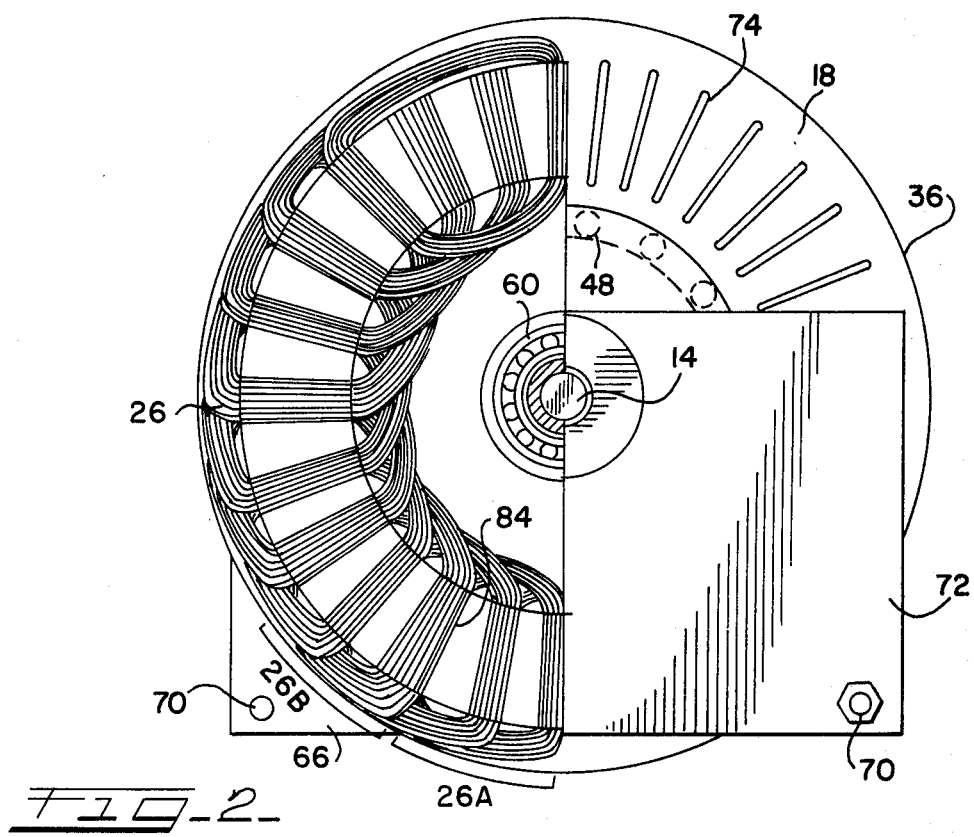
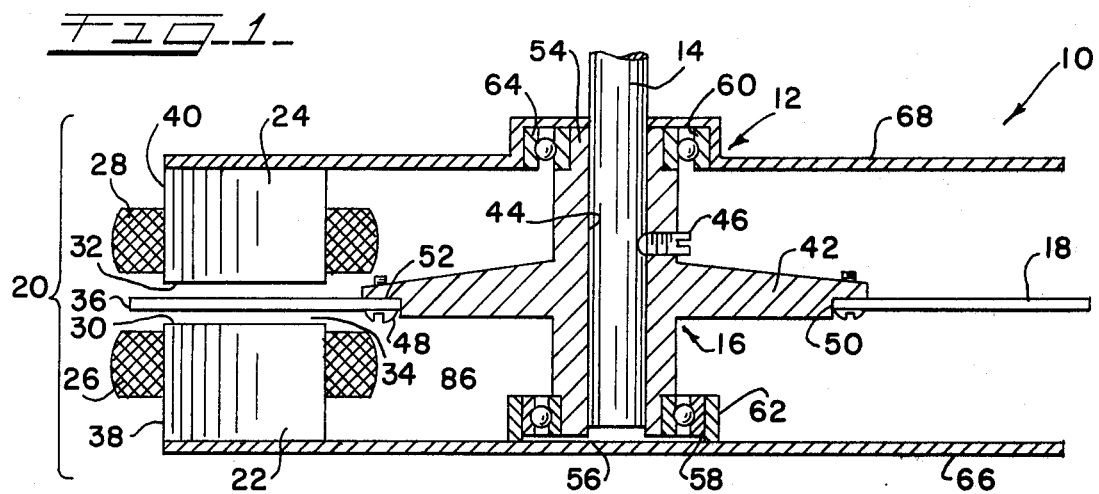

ELECTRIC MOTOR

BACKGROUND OF THE INVENTION

The present invention relates to electric motors, and more particularly to alternating current induction electric motors. In one form, the present invention is embodied in a direct drive motor wherein the output or drive shaft is fixedly attached through a hub to an annular, disc-like rotor member which is axially spaced apart from and lies between a pair of magnetic pole pieces, each having distributed two-phase windings lying in transverse slots in the pole pieces or stator bodies. The pole piece may be a single piece directed opposite to one face of the disc or rotor, or two pole pieces may be provided, each facing the other with the disc or rotor disposed therebetween. In either case, a magnetic return path is provided by a transverse slotted, so-called, return element of a permeable material. The function of this element may be carried out by a transverse slotted return element per se, or may be carried out by the other stator or pole piece, with each stator then serving as the return piece for the oppositely disposed stator in such a construction.

Various types of electric motors are known in the prior art, certain types of prior art motors having been customarily chosen for or particularly adapted to one or more advantageous uses, depending on the characteristics of the motor. Thus, in some instances, starting torque is not important and it is only required that the electric motor run in continuous use at a speed which is equal to or proportional to the frequency of an applied alternating current, such motor being referred to as a synchronous induction motor. In other cases, other characteristics desired for electric motors may be provided for the use in question. Included among such motors are so-called squirrel cage induction motors, so-called shaded pole motors, linear motors or linear actuators. Direct current (d.c.) motors or three phase (a.c.) motors are advantageous for a number of uses, but are not desirable for home appliances and other applications where direct or three phase (a.c.) current is not available without trouble and/or expense. However, many alternating current (a.c.) motors of known types are not generally readily able to produce powerful, rapidly reversing motion continuously, especially motion characterized by high starting and low rotational speed torque. Likewise, conventional motors, especially those having starting shunt windings and the like, generally draw very heavy current when they are started, and such motors therefore cannot generally be continuously operated in the starting mode, as would be called for by their use to preclude rapidly oscillating motion.

Other typical special purpose alternating current motors include the type used in a watt-hour meter, wherein a current winding and separate voltage winding only are used, and wherein the principle of operation is that of an eddy current motor. However, such motors do not produce appreciable torque at any speed.

Since one purpose of the present invention is to provide a motor which can operate directly as part of an oscillatable mechanism such as a washing machine agitator, it is necessary that a satisfactory motor for this purpose be able to be reversed continuously, occasionally stalled, and still be free from adverse effects. Thus, for example, it is recognized that there would be significant advantages in driving certain mechanisms directly, such as washing machine agitators and spin baskets, in which the oscillating motion required could be supplied directly from the motor rather than through a complex transmission which would otherwise by necessary to bring about the desired movement cycle. However, producing such motion directly is either not possible with heretofore available electric motors, or where possible, is of reduced efficiency.

Accordingly, an object of the present invention is to provide an electric motor of an improved design.

A further object is to provide an electric motor having relatively low rotor inertia and which is free from undesirable angular torque variations, sometimes manifested as so-called "cogging" or "wow".

A further object is the provision of an electric motor which may be continually oscillated and even stalled without developing undue heat and without drawing excessive current from the line circuit with which it is associated.

Another object is to provide a motor which is easily controllable through a wide range of speeds and torque loadings, particularly a motor which is free of negative torque and speed relational characteristics.

A further object is the provision of a motor which would exhibit such characteristics throughout a relatively broad operating speed band or spectrum.

Another object is the provision of a motor wherein relatively high torque may be generated directly even with a rotor having a fairly compact outside diameter.

Still another object is the provision of a motor wherein the windings are able to produce high force density.

A still further object is the provision of a motor which does not depend for its operation upon the generation of back electromotive forces created solely or principally in response to rotor or armature speed.

Another object is to provide an electric motor wherein the speed and torque outputs are relatively closely proportional to the voltage applied to the motor and which consequently is operable over a wide applied voltage range without loss of operating effectiveness.

Another object is the provision of a motor wherein current draw is largely limited by the inherent impedence of the circuits rather than by generated back electromotive forces ("e.m.f.'s.").

Another object is the provision of a motor wherein the movable elements are free from iron, with the result that variable counter e.m.f.'s and undesirable voltage harmonic frequencies are not generated to a perceptible extent.

A still further object is the provision of a motor whose relatively open construction provides for efficient heat dissipation.

A still further object is to provide a motor of the desired characteristics which will operate on commonly available household current.

Another object is the provision of a motor which may have a higher torque in one direction of rotation compared to its torque in the opposite rotational direction.

A still further object is to provide a motor whose torque can be varied by means of a switchably varied capacitance.

The present invention achieves these objects, and other inherent objects and advantages thereof by providing an electric motor having a drive shaft adapted to be rotated by a rotor unit in the form of a generally flat disc axially spaced from and passing in use closely adjacent the surface of pole pieces of an annular segmented configuration stator assembly and containing distributed multi-phase windings in slots formed therein. The windings for each pole being distributed in two or more pairs of slots.

The exact manner in which these objects and other inherent objects and advantages of the invention are accomplished will more easily be understood when reference is made to the accompanying detailed description of the preferred embodiments of the invention and to the accompanying drawings wherein like reference numerals indicate correspondng parts throughout.

BRIEF DESCRIPTION OF THE DRAWINGS

FIG. 1 is a vertical sectional view of an electric motor made according to the invention;

FIG. 2 is a top plan view, partially in horizontal section, showing various features of the electric motor of FIG. 1;

Figure 3:
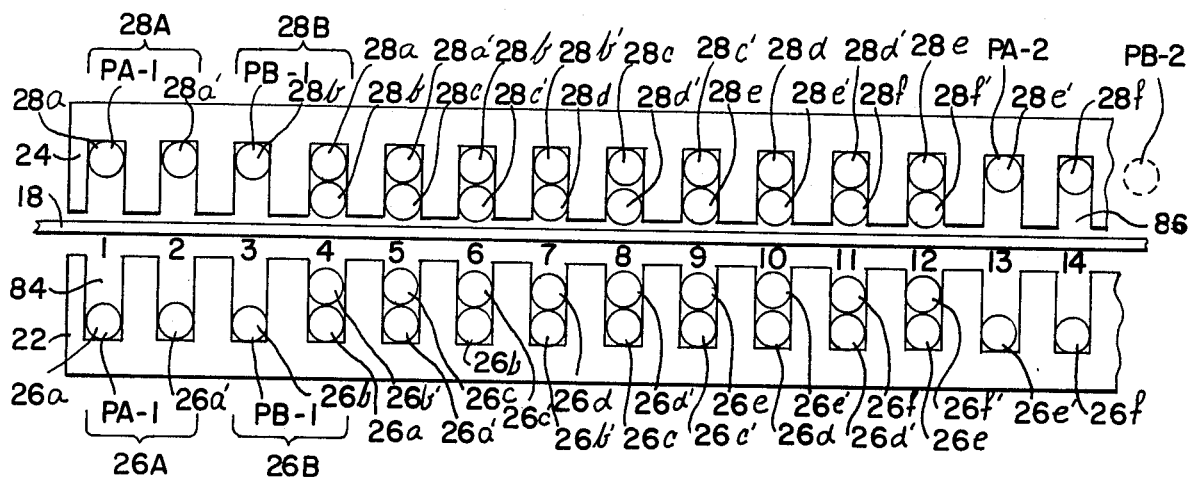
FIG. 3 is a straightened diagrammatic view showing one form of stator bodies or pole pieces which are useful with the invention and showing one typical manner of distributing the windings therein.

Before referring in detail to the preferred forms of motors embodying the invention, it will be understood that the motor will be described in reference to embodiments thereof wherein it is desired to drive a member or element with which the drive shaft is associated in use without the interpositioning of gears, pulleys, belts, or the like, and more particularly, without the interpositon of gears or other mechanism adapted to change the character of the motion undergone by the drive shaft. However, the motor of the invention is also useful in other environments, including those wherein, for other reasons, certain of these or other additional mechanisms may wish to be provided.

With the above in mind, reference will now be made to one preferred form of the motor of the invention, generally illustrated at 10 in FIG. 1. As clearly appears from FIG. 1, the motor 10 includes a number of principle elements, namely a motor frame assembly generally designated at 12, a drive shaft 14, and a rotor assembly 16 which includes, on the outer portion thereof a generally thin, flat, annular rotor disc 18. The other principle element is the pole piece or stator assembly 20 which, in the illustrated embodiment, includes a lower stator body 22 having axial slots 84 therein in which lower windings 26 are positioned and an upper stator body 24, having axial slots 86 therein in which upper windings 28 are positioned. Between the axially facing portions 30, 32 of the lower and upper bodies 22, 24 is an air gap 34 through which the rotor disc 18 passes, with the outer edge 36 of the rotor 18 lying radially outwardly of the outermost edge portions 38, 40 of the stator bodies 22, 24 and the inner edge 50 lying radially facing inwardly of the stator bodies 22, 24.

By reference to FIG. 1, it will also be seen that the rotor assembly 16 includes a hub portion 42 with a cylindrical bore 44 therein. Hub-to-shaft locking means in the form of a key or set screw 46 secures the hub 42 to the shaft 14. The rotor disc 18, which is preferably comprised of a non-magnetic, electrically conductive material such as aluminum is secured to the hub portion 42 by a plurality of fasteners 48 extending through the inner margin 50 of the disc 18 and into an outer margin or flange 52 of the hub 42.

The axial ends 54, 56 of the hub 42 are supported as by bearings 58, 60 having the radially outer portions thereof journalled in sleeves 62, 64 forming respectively portions of the bottom plate 66 and the upper plate 68, which are both principle elements of the motor frame assembly 12. Referring now in particular to FIG. 2, it will be noted that fasteners such as bolt 70 or the like extend through an outer portion 72 of the upper plate 68 and downwardly therefrom into a corresponding position on the lower plate 66 in order to maintain the respective plates in a fixed relation to each other. FIG. 2 also shows that the body portion of disc 18 includes a plurality of radially extending air gaps or openings 74 or relatively slight circumferential extent. Openings 74 are elongated radially so as to have somewhat greater radial extent than the radial width of one or both of the stators 22, 24. The function of these units will become more apparent as the description proceeds.

FIG. 2 also shows that the lower windings generally denoted 26 and forming a portion of the lower stator assembly 22 actually are in two groups, a first or so-called "A" phase winding 26A and a second or so-called "B" winding 26B. Referring to FIG. 3, which is a diagrammatic edge view of the motors taken as though the stators 22, 24 were straight instead of being annular segments, will enable an easier understanding of the windings configuration of one embodiment of the invention. The coil winding configuration will first be discussed for winding 26 in lower stator 22 wherein there are pairs of each letter indicating sections of the same soil. In the Figure, the letters 26a, 26a', 26c, 26c', and 26e, 26e' all refer to coils of the so-called A phase of lower winding 26. The other letters 26b, 26b', 26d, 26d', and 26f, 26f', refer to coils of the so-called B phase of lower winding 26. The coils 26a and 26a', 26b and 26b', will be wound in a manner such that the current direction will be the same in each coil; therefore coils 26a and 26a' taken together will form one magnetic pole of the motor, likewise letter pairs 26b-26b', 26c-26c' and so forth create single poles. The direction of winding of the poles is such that alternate poles of a given phase will form opposite magnetic poles for a given direction of current flow. For example, in FIG. 3, if 26a-26a', create a north magnetic pole, 26c-26c' which are coils of the same phase will create a south magnetic pole for a given direction of current flow in so-called A phase. Likewise, if 26b-26b' form a north pole, then 26d-26d' will form a south pole at the same instant of time in so-called B phase.

Normally, each of the phases in a stator segment might contain the same number of coils and therefore an equal number of magnetic poles, however; as may be advantageous in certain applications, one or more coils may be eliminated in one phase as compared to the other such that the current phase shift caused by the capacitor, as described later herein, will be different for one direction of rotation than for the other direction. This will result in the torque being greater in one direction of the rotation than in the opposite direction of rotation. For example, in FIG. 3 if the coil 26f is eliminated, or if both coils 26f and 26f' are eliminated, there will be fewer coils in "B" phase than in "A" phase. Assuming that the same size, and number of turns of wire are used in all coils of both phases, the phase "B" will have a lower total reactance than phase "A".

Figure 4:
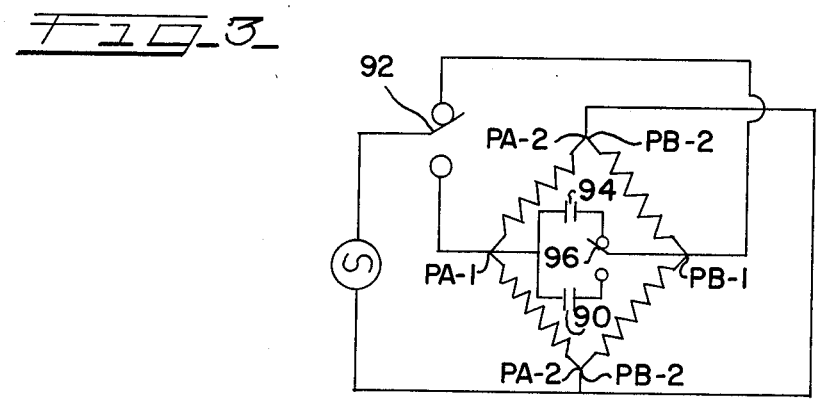
FIG. 4 is an electrical schematic diagram of the motor.

Referring now to FIG. 4 which is an electrical schematic of the motor (with two stators), it can be seen that if the reactances of PA-1, PA-2 and PB-1, PB-2 are equal, then capacitor 90 will cause the same amount of phase shaft regardless of the position of reversing switch 92. However, as explained heretofore, if the reactances of PA-1, PA-2 and PB-1, PB-2 are unequal then the position of reversing switch 92 will determine the relative reactances of the two phases and therefore the phase shift caused by capacitor 90. It will be understood that this same unbalanced torque, just explained, could be produced by other unequal numbers of turns in the coils of the two phases or by using larger or smaller wire in one phase with respect to the other or by any other arrangement causing an unbalanced reactance in the phases. Only the wiring arrangement of lower stator 22 has been discussed to this point.

Further reference to FIG. 3 will show that stator 24 has winding 28 arranged in a similar manner. However, it will be realized that the coils 28$a$, 28$a'$, 28$b$, 28$b'$, 28$c$, 28$c'$, etc., of winding 28 in the upper stator 24 must be wound in such a manner that the magnetic poles produced in that member will be opposite to those produced in winding 26 of lower stator 22 if the stators are to be run cooperatively. If the stators are to be energized separately or in a non-cooperative manner, as for example, if different wiring arrangements are employed in the two stators this obviously is not necessary. Still further reference to FIG. 4 shows capacitors 90 and 94 (which are of unequal value) arranged with switch 96 will determine the amount of capacitance introduced into the circuit at any desired time. Since for a given set of conditions the amount of torque produced by this motor is dependent upon the amount of introduced capacitance, this arrangement is valuable, as in a washing machine for example, for providing high values of torque for maximum washing or high speed spinning conditions while low values of capacitance may be used for gentle washing action or for low spinning rate.

Arrangement of the windings according to the present invention allows the slots 84 in the respective stator bodies 22 and 24 to be of a simple open construction. Because the individual poles are of multiple coil construction a tooth with parallel sides will not tend to produce "slot lock" or "wowing" effects at any operating speed. In prior art the use of so-called "closed slot" construction is employed to overcome slot lock and wow effects. Such construction results in the magnetic flux being distributed over a relatively larger tooth area than in the present parallel slot configuration. Since the force developed by the motor is proportional to the product of the tooth area times the flux density squared, the present configuration achieves higher efficiencies than prior art while at the same time eliminating the slot lock and wow effects of former art using this slot configuration.

It will be understood that both the windings A and the windings B are shown as being equally spaced, that is, each leg of each coil occupies every third slot. However, one winding may be arranged so that the legs of each coil fall into more remotely spaced apart slots, that is, one winding may have the legs of each coil falling into every third slot with the other winding having the legs thereof falling into every fourth, sixth or eighth slot, for example. By reason of the excitation of these coils with alternating current, with the current in one set of windings being out of phase with respect to this current in the other set of windings, a moving magnetic field will be created in a well known manner, and the result will be that reactive forces are created by current induced in rotor 18, causing motion of the rotor disc 18. Since the nature of the magnetic field is such that the current direction is reversed every time the polarity of the signal is reversed, the changes in the magnetic field occur at relatively wider or more closely spaced apart intervals, depending on the configuration of the coils. Thus, for higher rotational speeds, the coils are arranged so as to form a relatively small number of equally spaced poles in the circular stator, whereas, for a slower speed, a greater number of poles are provided. For example, assuming a sixty cycle current with a four pole arrangement, a speed of 1800 r.p.m., less slippage would be provided, whereas a two pole arrangement would provide 3600 r.p.m. and an eight pole arrangement 900 r.p.m.

Referring now to another feature shown in FIG. 2, namely, the openings 74 in the rotor 18, it will be understood that, in use of the motor, the magnetic current paths pass generally radially through the stator, causing the magnetic field associated with such current paths to be repelled from magnetic fields generated by the windings within the stator bodies 22, 24. In order to confine these current paths for increasing the density thereof and to minimize straying of the current and creation of undesirable eddy currents, the openings 74 are provided. It is understood, however, that these air gap openings are only one form of electrical insulating means which may be provided to insure that the current paths do not pass therethrough; other equally suitable means may be provided for this purpose.

In keeping with the principles of the invention, a stator body and multiple-phase coil assembly of this type could also be used as the upper stator 24, whereas a different winding arrangement could equally well be used for the windings 28$a$, etc., of upper stator 24. In the latter case, energizing the upper stator would result in different rotor disc speed or torque characteristics, while making the upper stator 24 of the same configuration as the lower stator 22 and operating both stator assemblies simultaneously would result in the same speed characteristics for the shaft 14 as would be provided with one stator, but approximately twice the torque that a single stator could provide approximately equal voltage and current in both the upper windings and the lower windings.

Figure 5:
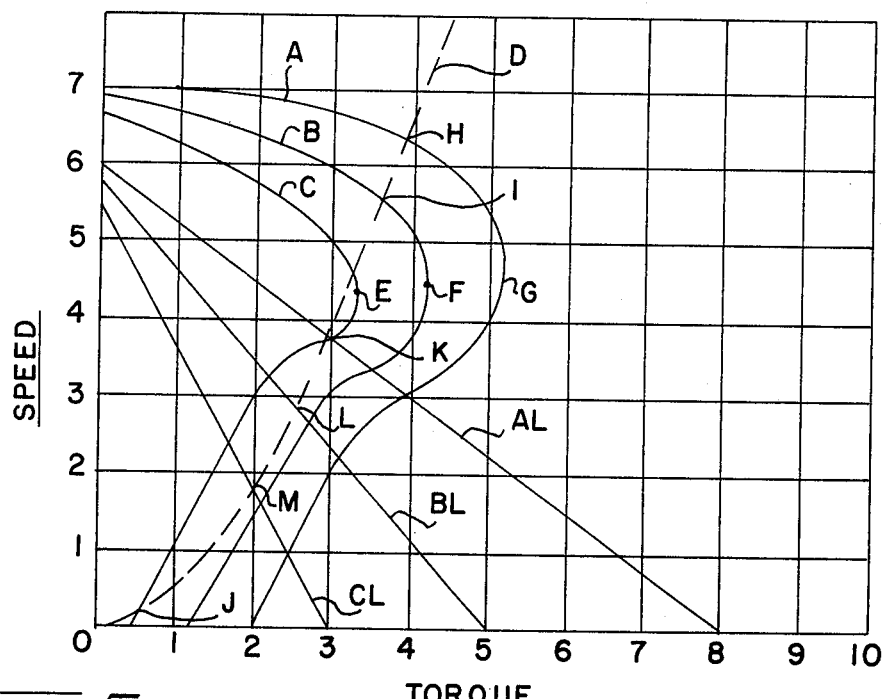
FIG. 5 is a graph showing the speed and torque characteristics of the motor of the invention as well as such characteristics of typical prior art induction motors.

Referring now to FIG. 5, a speed versus torque graph of various electrical motors, including prior art motors, is shown with the generally more curvilinear family of lines A, B, and C illustrating the typical performance of an alternating current induction motor of the type which is customarily used, in conjunction with a mechanical transmission, to operate a washing machine or the like, wherein an agitator must be continually accelerated, decelerated, its direction reversed, and the process again repeated, many times per minute. Curve A illustrates the performance of such motor at a full reference voltage, curve B shows the performance of such a motor at 90 percent of the reference voltage and curve C shows the performance at 80 percent of such reference voltage. Curve AL, BL, and CL, respectively show the speed versus torque performance of a motor made according to the present invention, with curve AL showing the performance at the reference voltage, curve BL the performance at 90 percent of such voltage, and the CL curve the performance with 80 percent of such voltage applied.

The broken line curve D is a curve generally showing the required torque to drive typical loads, such as the load on a fan driven in air, a hydraulic pump, or washing machine in a loaded condition. From this curve, it can be seen that increased torque is required as the rotational speed attempted to be applied to the load is increased. Comparing the load requirements illustrated by a broken line curve D to the torque available from a conventional induction motor to perform such task, it will be seen that the A and B curves are intersected by curve D at a relatively high r.p.m., but that curve D also intersects curve C at point J, the ordinate of which is only 300 r.p.m. or 0.3. On the other hand, reference speeds of 6.4 and 5.7 respectively are available at the intersections of points H and I with curves A and B.

The conventional induction motor cannot be operated at point J, since this point is below the so-called pull-out or breakdown torque of the motor, and motor operation in this range characteristically involves the use of far too much current to permit continuous operation. As is well known, induction motors are intended to operate not only above the pull-out torque, but also in the speed ranges which lie somewhat above the speeds at which maximum torque (points E, F, and G) occurs. In other words, maximum torque for the given voltage is generated at points E, F, and G, where the speed torque curves have points of inflection of "knee". However, an induction motor cannot be operated satisfactorily at maximum torque continuously without the danger of excessive current consumption, overheating and damage to the motor. Therefore, such a motor is commonly operated in a speed range higher than that at which the maximum torque is developed and the torque used during normal operation should be between about one-third and two-thirds of the maximum torque which the motor is capable of producing. In this connection, it will be seen that line D intersects point curve C very near point E, and that accordingly, a motor having a voltage level corresponding to C could not be operated under torque conditions such as those illustrated by curve D. Thus, at a lower than optimum voltage, typical induction motors could not cope with the conditions imposed by a load of the type illustrated by line D and satisfactory results could not be obtained with such an arrangement.

In contrast to the above situations, reference may be made to points of intersection K. L, and M wherein curves AL, BL, and CL intersect curve D respectively at reference speeds of about 3.8, 2.9, and 1.9. Thus, it will be seen that voltage variations result in relatively linear changes in torque and speed, while, in any case, the speed generated is such that maximum torque is not required to be produced by the motor. Therefore, load "D" can be adequately handled by a motor according to the invention, even if the motor is operated at relatively low voltage.

Referring now to another aspect of motor performance, in a conventional induction motor, maximum torque is produced when maximum electrical power is transferred from the stator or field of the conventional motor to the motor bars of the rotor through the air gap. The inductive power thus transferred may be compared with the situation in a transformer with the motor field or stator being analogous to the primary windings of the transformer and the rotor conductors or bars being analogous to the secondary or output winding of the transformer. In such a case, maximum power transfer, resulting in maximum output torque, occurs when the resistance of the rotor portion of the circuit is equal to the inductive reactance of the rotor. In a motor constructed according to the present invention, a very low resistance material, such as a sheet of aluminum, has very low resistance, and maximum torque is therefore transferred when the inductive reactance of the circuit is a minimum. Such a condition takes place when all magnetic material is eliminated, since iron or other ferromagnetic material, has very great reactance. Accordingly, maximum torque is produced in the motor of the invention at or in the region of the stall speed. This feature, namely, very high starting torque, is ideal when a heavy load is to be directly driven by the shaft 14. This is the case where the shaft 14 is directly connected to a washing machine agitator, for example, and wherein the agitator not only has relatively high inertia and considerable resistance to acceleration, but most continually also undergo braking and subsequent acceleration in the opposite direction. In this connection, it is apparent that greater overall efficiency results when the inertial effects of the load are substantially the only inertial effects present, and this is made possible in the present invention by the provision of the lightweight rotor assembly 16. By reference to FIG. 1, it may be seen that, not only is the entire unit of relatively light weight construction, but also those portions having considerable mass lie nearest the centerline of the drive shaft 14. Accordingly, in use, no excessive inertia, which would be present in the case of a heavy iron and copper armature, is present and such a motor may therefore be readily rapidly reversed.

Another advantage of the motor construction of the invention is that, since aluminum or other non-magnetic material is used for the rotor disc, the sheet or disc type rotor has very low inductive reactance as well as low resistance, and the counter e.m.f.'s generated thereby is also very low and varies only slightly with changes in speed or at stall conditions. In contrast, a conventional induction motor undergoes considerable change of inductive reactance as the rotor or armature varies between a stalled condition and a normal operting speed. The changes in counter voltages or counter e.m.f.'s are typically twenty times or more during such variation, that is the rotor has up to 20 times as much counter e.m.f. at normal operating speeds that it has when the rotor is stalled, and according such motor, as a practical matter, does not have the operating current thereof limited by the impedance of the windings, but only by the counter e.m.f. developed by the rotor. Whereas in some situations this may be advantageous, it is, in other circumstances a disadvantage since under some conditions, particularly heavy load, low speed conditions there is relatively little impedance developed merely by the windings, and excessive current may be drawn therethrough. On the other hand, a motor made according to the present invention may have the impedence thereof principally or virtually entirely, limited by the impedence of the windings, since counter e.m.f.'s developed during any speed change likely to be encountered are only of the order of 5 percent or less, for example, even when speed varies between a free synchronous speed and a zero speed or fully stalled condition of the rotor. A motor according to the present invention therefore does not develop excessive heat, since heat generation, which is determined by the product of the resistance and the square of the current, is most pronounced upon sudden current rises. In the present invention, there are no large variations in current, because a motor designed with a given total impedance, at a given ordinary current capacity, will not undergo a change in either of these variables even as exterior conditions change, and accordingly, will not be prone to sudden heating. In other words, the motor may be designed to accommodate the amount of heat developed by so-called $I^2R$ losses during normal use and the values of I and R will not vary greatly thereafter, with the result that excessive undesirable heat will not build up in such a motor.

Another advantage of the motor is that since the stator is less than 360° in extent, heat dissipation is more efficient than would be the case with 360° stator(s).

One other desirable characteristic of a motor constructed according to the present invention is that stray or eddy currents which are in a neutral or non-additive direction in relation to the production of magnetic fields in the desired direction, offset each other and generate heat but do not produce the magnetic fields of increased strength necessary to generate additional torque. Accordingly, the openings 74 in the disc 18 should, as closely as possible, be insulated to a radial length equal or slightly greater than the radial dimensions of the stator bodies 22, 24, while the outer margin 36 of the disc should overlap stators 22, 24. Likewise, the inner edge 50 should extend radially inwardly of the innermost dimension of stator bodies 22, 24 to provide, both at the inside and the outside low resistance circumferential current paths outside the most concentrated magnetic lines of force, the paths of the current in such motor permit a low resistance electrical connection between adjacent radial current paths. Such a continuous path in an induction motor, when taken in conjunction with the paths followed by the radial currents by the rotor bars, sometimes cause such a motor to be characterized as a so-called squirrel cage motor. A motor of the present invention has analogous electrical paths and may, in this sense, be considered as being a motor having a fully circular, axially facing stator with characteristic squirrel cage currents therein, the meaning of such expressions being well known to those skilled in the art of electrical motors.

In the use of the electric motor of the invention, it may be assumed that one electrical phase is suitably connected to connectors PA-1 and PA-2, and that another electrical phase is connected to connectors PB-1 and PB-2. Upon energization, the low inertia disc 18 will be strongly and rapidly accelerated in a given direction and, depending on conditions of load, will tend to approach a predetermined synchronous velocity. In the event such a motor is arranged so that the shaft 14 thereof directly drives a washing machine agitator, for example, it will be desired to periodically reverse the direction of the agitator, perhaps at the rate of five to thirty or more cycles per minute. Accordingly, an electrical or mechanical means may be provided external to the circuitry of the motor for this purpose. Such a device, which is schematically shown at 92 may be the same as shown in U.S. Pat. No. 3,914,963 or may be of other types known in the art. With such a reversing connector or switch 92 being operated, the motor will, for example, initiate a clockwise rotation, and thereafter be forcefully braked toward a stop, and then accelerated in the counterclockwise direction until the action is once again reversed.

Assuming that the associated parts of a washing machine or the like are properly mechanically connected, such an exterior switching mechanism may then be disconnected or deactivated and the motor may be used to operate the spin basket of a washing machine in a continuous unidirectional rotational mode. The speed of this mode would, as pointed out above, depend on the number of slots in the stator which were actually used for windings. In the event that a low torque, high speed mode of operation of the driving shaft 14 is desired on one type of operation and a high torque low speed mode for another type of operation, the lower and upper stators 22, 24 may contain windings which are arranged so that one would include an eight, twelve, or sixteen pole stator, while the other might have a lower number of poles, such as two or four poles in the stator. In such a case, the stator not being used would serve as a return iron for the magnetic path directed in the opposite stator when such opposite stator were activated, and vice versa. In the event that only the stator 22, for example, would contain windings, magnetic return path means or so-called return iron disposed in an oppositely facing relationship should be provided. Preferably, construction of this member may be of a conventional type, that is, a soft iron unit, preferably laminated having slots of the type shown at 84 in FIG. 2, and being in every respect the same as stator 24 except that windings would not be provided therein.

As pointed out above, however, the motor may be operated with identical windings being provided in both the bottom and top 22, 24 and the coils 26, 28 of such stators may be simultaneously actuated, each stator providing a return path for the magnetic fields generated by its counterpart. Motors constructed according to the present invention provide a highly compact construction which is economical and efficient in use, producing speed and torque characteristics of the type which are highly desired for direct drive applications involving high starting torque and highly controllable heat generation and speed control.

It will thus be seen that the present invention provides a new and improved electrical motor having a number of advantages and characteristics, including those herein pointed out and others which are inherent in the invention.

I claim:

1. An electric motor comprising, in combination, at least one stator unit including a stator body defined in part by inner and outer margin portions, said stator body also having at least one generally flat surface portion and a plurality of spaced apart slots in said body, said slots communicating with said body surface and extending between said margins transversely of said stator body and said slots being of an open parallel side configuration, at least two stator windings identifiable as separately energized, each having portions thereof lying in at least two pairs of said slots such that each motor pole consists of at least two separate coils each of said stator windings being adapted to be energized by an electrical source which is out of phase with respect to the source energizing another of said windings, a rotor assembly having a motor drive shaft associated therewith, said rotor assembly including an annular disc portion formed from electrically conductive non-magnetic material and having inner and outer margin portions defining the radially inner and outer edges thereof, said disc having between said margin portions a pair of generally flat, generally axially facing surfaces defining therebetween a principle disc body portion, the margins of said disc being respectively of greater inward and outward radial extent than the inward and outward radial extent of the margins of the stator which said disc is associated, said flat surface portion of said stator body being disposed in opposed facing relation to one of said surfaces of said disc body, said stator surface and said disc surface defining therebetween an axial air gap, magnetically permeable means forming a return path for the magnetic fields generated in said stator, said return means also being spaced apart from said other disc surfaces by a second axial air gap, means for reversing the electrical connections to said windings, whereby said motor may be operated reversibly, a capacitor for creating phase shift whereby said motor is usable on commonly available single phase power supplies, and the value of capacitance being switchably changeable for providing varying output torques.

2. A motor as defined in claim 1 including a pair of opposing stator bodies positioned in spaced axial relation from said surfaces of said rotor disc, the windings in both of said pair of stator bodies being energized at the same time.

3. A motor as defined in claim 1 including a plurality of stator bodies positioned in spaced axial relation from said surfaces of said rotor disc, the winding in each of said stator bodies being of a different configuration than the winding in each of the other of said stator bodies, and each body being energized at a different time than the other is energized, whereby said motor may be operated in more than one rotational mode.

4. A motor as defined in claim 1 in which said stator body is in the form of an angular sector of an annulus.

5. A motor as defined in claim 1 in which a plurality of generally radially directed current paths are provided in said disc body by providing therein a plurality of radially extending, electrically insulating areas defining therebetween said radial current paths, said insulating areas having substantially the same radial extent as the radial extent of the stator body associated with said body.

6. A motor as defined in claim 1 in which said magnetically permeable return path means comprises a body having the same general configuration as said stator body, said return path means having no windings associated therewith.

7. A motor as defined in claim 1 in which said disc comprises aluminum.

8. A motor as defined in claim 1 in which said motor drive is fixedly connected to said disc portion of said rotor by a rotatable central hub.

9. A motor as defined in claim 5 in which low resistance current paths are provided respectively joining the ends of the generally radially directed current paths, said joining paths extending circumferentially of said disc body and lying outside of the concentrated flux area of the stators.

10. A motor as defined in claim 1 wherein said phase windings have unbalanced reactance for providing different forces in the two different directions of rotation.

11. A motor as defined in claim 1 wherein the winding of individual poles is disposed in more than one coil for providing smooth operation under all conditions of operation without slot lock or wowing effects.

12. A motor as defined in claim 1 wherein the manner of winding allows the most efficient slot configuration for high motor efficiency.

* * * * *

UNITED STATES PATENT AND TRADEMARK OFFICE
CERTIFICATE OF CORRECTION

PATENT NO. : 4,081,726
DATED : March 28, 1978
INVENTOR(S) : C.M. BRIMER ET AL

It is certified that error appears in the above-identified patent and that said Letters Patent are hereby corrected as shown below:

--Column 4, Line 15--
"or" should be "of"

--Column 6, Line 34--
"multiple should be "multi"

--Column 7, Line 61--
"motor" (second occurrence) should be -- rotor --.

--Column 8, Line 41--
"Operting" should be "operating"

--Column 8, Line 45--
"that" should be "than"

--Column 9, Line 23--
"dimensions" should be "dimension"

--Column 10, Line 7--
"on" should be "for"

Signed and Sealed this

Sixth Day of February 1979

[SEAL]

Attest:

RUTH C. MASON
Attesting Officer

DONALD W. BANNER
Commissioner of Patents and Trademarks